J. E. BROWN.
AUTOMATIC FEEDER FOR MOLDING AND MATCHING MACHINES.
APPLICATION FILED MAR. 16, 1917.

1,240,665.

Patented Sept. 18, 1917.
6 SHEETS—SHEET 1.

WITNESSES

INVENTOR
J. E. Brown.
BY
ATTORNEYS

J. E. BROWN.
AUTOMATIC FEEDER FOR MOLDING AND MATCHING MACHINES.
APPLICATION FILED MAR. 16, 1917.
1,240,665.
Patented Sept. 18, 1917.
6 SHEETS—SHEET 2.
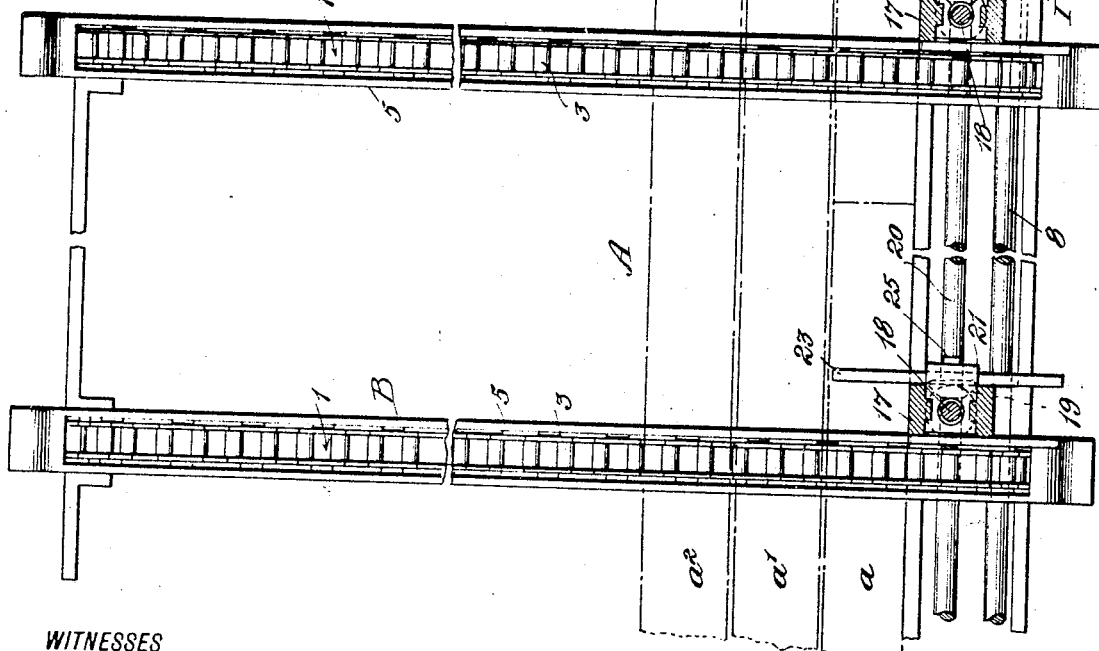
WITNESSES
INVENTOR
J.E.Brown.
BY 
ATTORNEYS

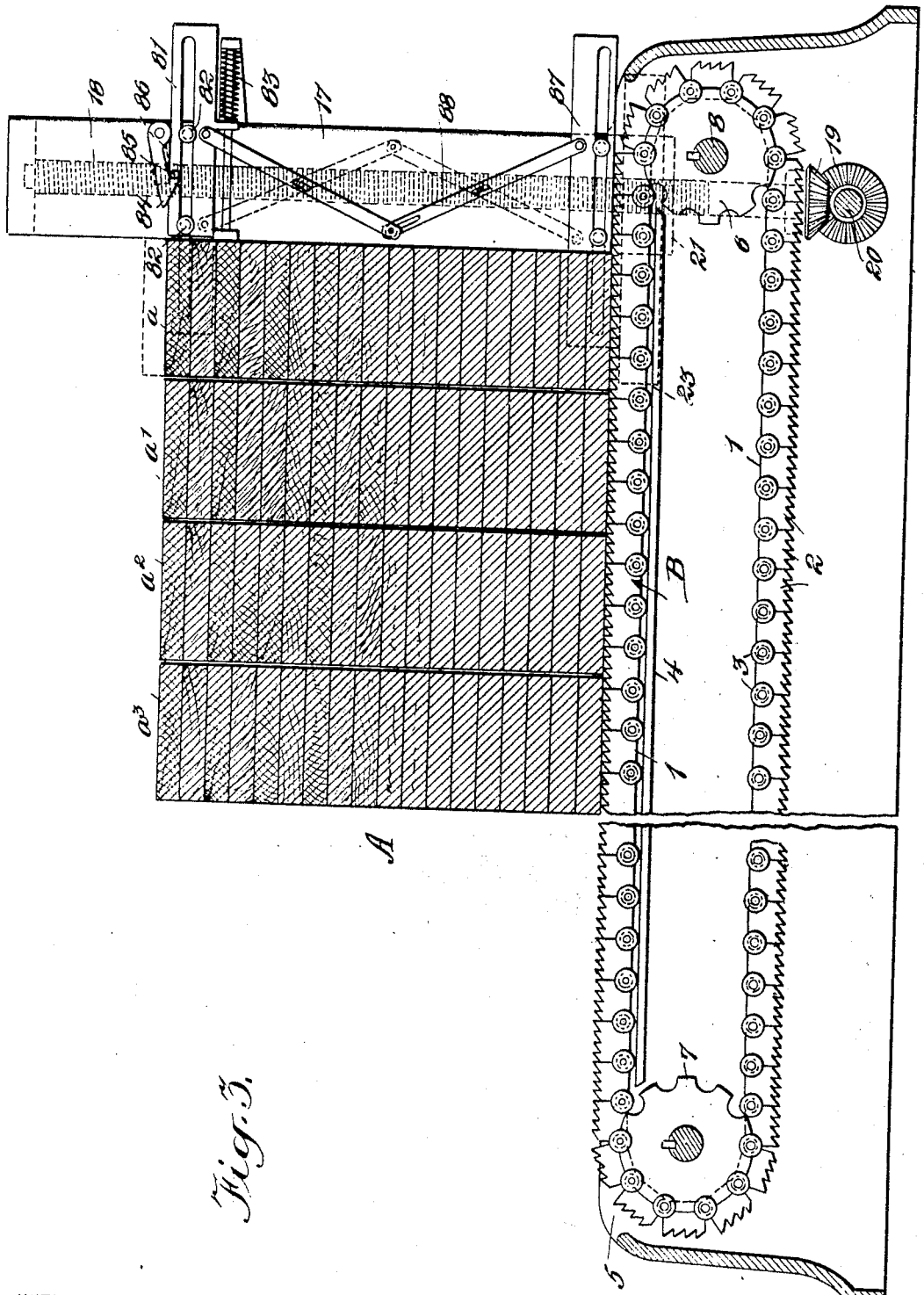

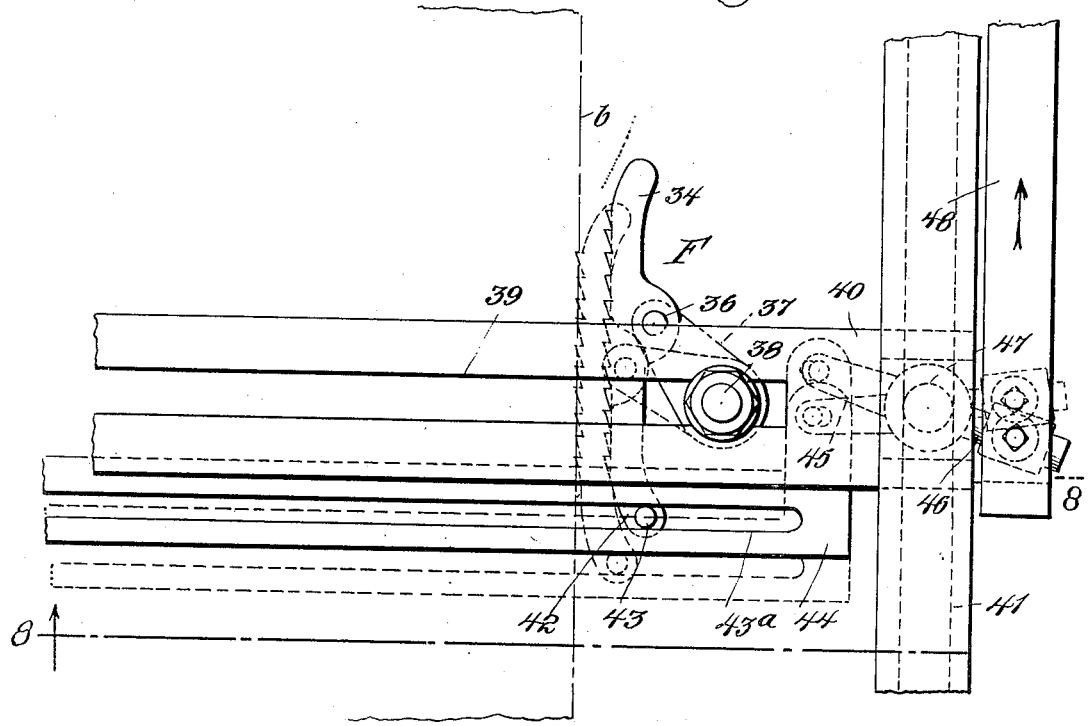
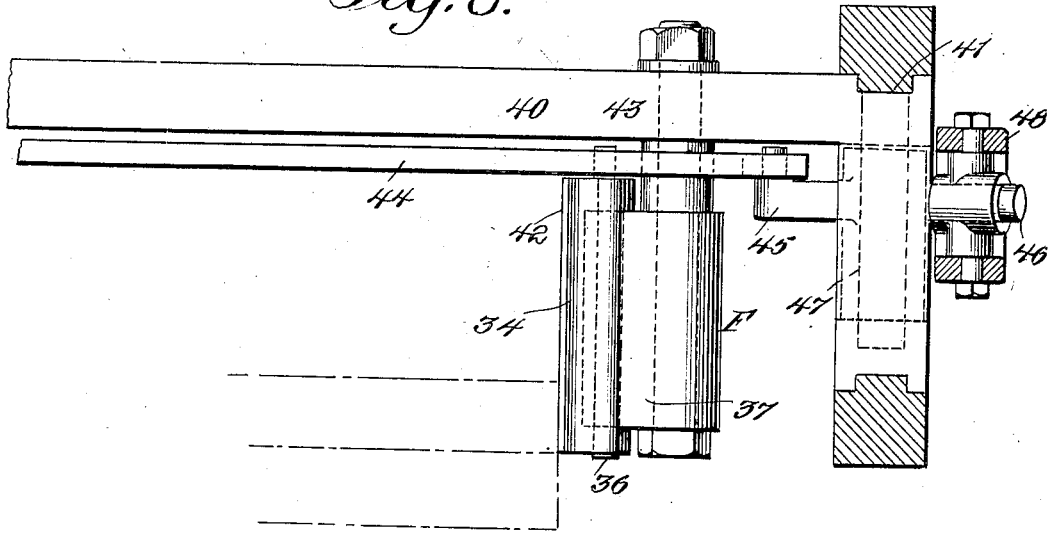

J. E. BROWN.
AUTOMATIC FEEDER FOR MOLDING AND MATCHING MACHINES.
APPLICATION FILED MAR. 16, 1917.
1,240,665.
Patented Sept. 18, 1917.
6 SHEETS—SHEET 6.
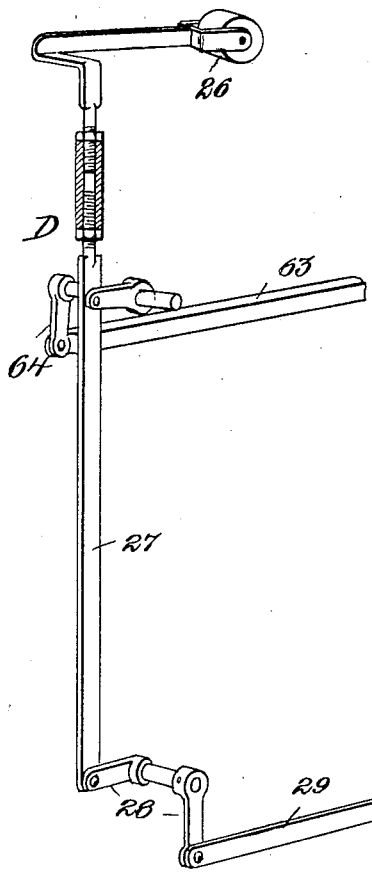
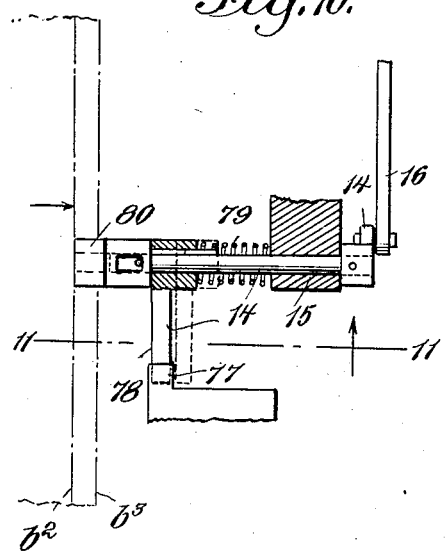
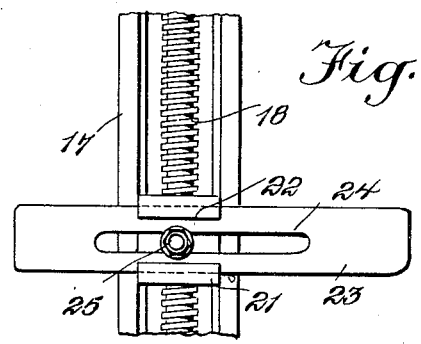
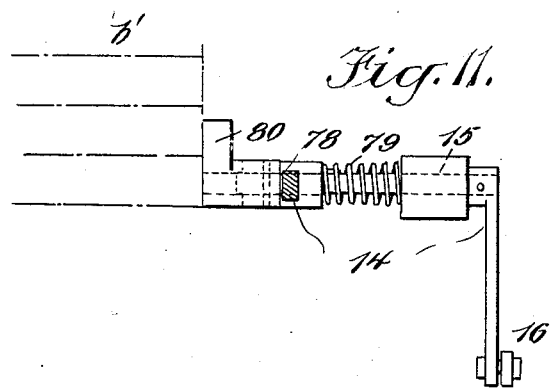
WITNESSES
INVENTOR
J. E. Brown.
BY
ATTORNEYS

UNITED STATES PATENT OFFICE.

JAMES E. BROWN, OF BROOKLYN, NEW YORK.

AUTOMATIC FEEDER FOR MOLDING AND MATCHING MACHINES.

1,240,665.  Specification of Letters Patent.  Patented Sept. 18, 1917.

Application filed March 16, 1917. Serial No. 155,200.

*To all whom it may concern:*

Be it known that I, JAMES E. BROWN, a citizen of the United States, and a resident of the city of New York, borough of Brooklyn, in the county of Kings and State of New York, have invented a new and Improved Automatic Feeder for Molding and Matching Machines, of which the following is a full, clear, and exact description.

This invention relates to woodworking machinery and deals particularly with a feeder adapted to be applied to a molding or matching machine whereby boards of varying lengths may be fed successively and in a continuous manner to the machine.

The invention has for its general objects to provide an automatic lumber feeder of such construction that a quantity of lumber necessary for a day's run of the molding or matching machine can be automatically fed, it being merely necessary for the operator to pile the lumber in regular stacks disposed side by side on a pile carrier which moves intermittently to carry the successive stacks to feeding position.

A more specific object of the invention is the provision of a novel combination of instrumentalities whereby the stack of boards is elevated step by step to enable the uppermost boards successively to be gripped by feeding jaws which deliver the boards to the machine, and when the last board of a stack has been delivered to the jaws the stack elevating means is returned to normal position and in so doing the pile carrier is automatically operated another step to bring the next stack into coöperative relation with the stack elevating means, and when this is done the pile carrier is automatically disconnected from its operating means and the elevator again moves step by step.

Still another object of the invention is the provision of a novel, simple and effective means for opening and closing the board-gripping jaws and reciprocating the same to feed a board into the machine.

Another object of the invention is to provide a novel controller which drops when the end of a fed board passes from under it, and which is raised by the upward movement of the stack, the dropping of the controller throwing the elevator into operation and the raising of the controller throwing out the elevator and setting the jaws into motion to grip and feed the uppermost board, there being automatic means for stopping the operation of the jaws when the board is fed into the gripper rolls of the molding or matching machine.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a front view of the machine with a portion in section;

Fig. 2 is a horizontal section on the line 2—2, Fig. 1;

Fig. 3 is a vertical section on the line 3—3, Fig. 1;

Fig. 7 is a plan view of one of the board-gripping jaws and associated parts;

Fig. 8 is a vertical section on the line 8—8, Fig. 7;

Fig. 9 is a perspective view of the controller for throwing the feeding jaws and the stack elevator into and out of action;

Fig. 10 is a detail sectional view on the line 10—10, Fig. 2, and showing the stop means for the pile carrier;

Fig. 11 is a detail sectional view on the line 11—11, Fig. 10; and

Fig. 12 is a detail view of one of the elevator arms.

Figure 1:
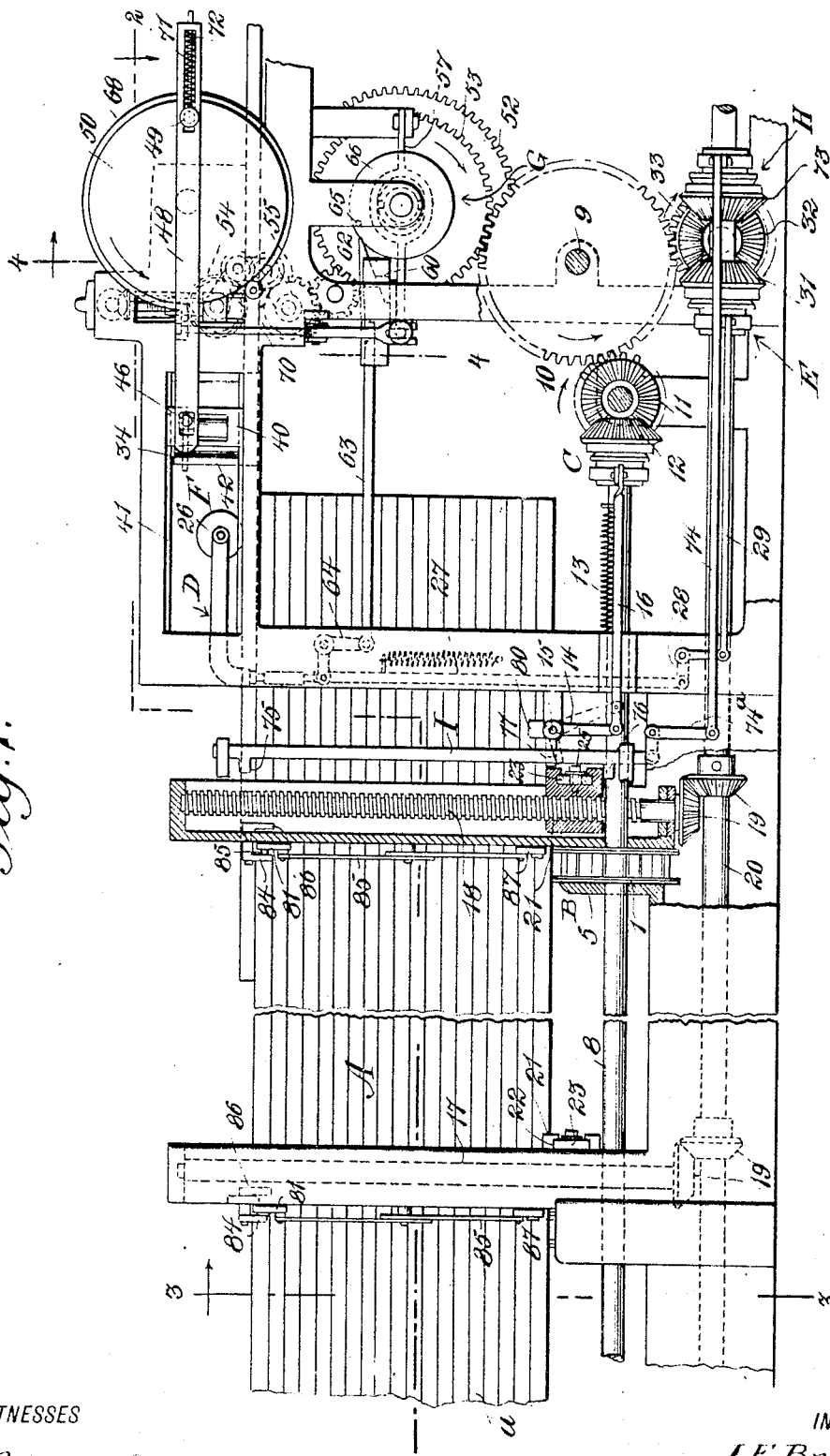

Referring to the drawing, A designates a pile of lumber made up of an indefinite number of stacks $a$, $a'$, $a^2$, $a^3$, etc., and these stacks, which are arranged side by side, are supported on a carrier B comprising a plurality of parallel endless chains 1, the links of which are provided with teeth 2, and the chains are provided with rollers 3 which ride on horizontal rails 4 formed on the horses or frames 5, and located on the upper flights of the chains, so that the stacks of lumber will rest on the upper flights and the lowermost board of each stack will be engaged by the toothed links, and consequently when the chains move simultaneously in the same direction, the pile of boards will be carried laterally as a unit. The chains 1 pass around sprocket wheels 6 and 7, the former of which are mounted on a horizontal drive shaft 8 journaled in the base of the apparatus. The shaft 8 is adapted to have an intermittent motion which is derived from a suitable drive shaft, such as the shaft 9, Fig. 1, which operates through gearings 10 to rotate the bevel gear 11, the latter meshing with a bevel gear 12 which is connected with the pile carrier operating shaft 8 through the clutch C. When the clutch is open the pile carrier B is idle, but when the clutch is closed the pile carrier moves a distance which is determined by the width of the board, there being a suitable stop means to cause the clutch to open automatically when the pile has moved a distance equal to the width of a stack. The clutch C is normally held open by a spring 13, Fig. 1, and is adapted to be closed by a bell-crank lever 14 which is fulcrumed at 15 and connected by a link 16 with the movable element of the clutch.

At the front of the machine the frame is formed with standards 17 which, like the carrier chains, can vary in number according to the length of the boards to be fed. In each standard is a vertical elevating screw 18 which has its lower end connected through gearing 19 with a horizontal drive shaft 20 common to all the elevating screws. On each screw is a block 21 which is adapted to be raised and lowered by the turning of the screw, and on the side of each block is a horizontal guideway 22 in which is a horizontal arm 23. To provide for horizontal adjustment of each arm 23, the same has a longitudinal slot 24 through which extends the bolt 25 that clamps the arm to its associated carrier block 21. The arms 23 extend rearwardly under the foremost stack of boards, and the arms are adjustable as to length so as to accommodate different widths of boards. The arms are all on the same level and as the arms move upwardly simultaneously they will raise the foremost stack of boards. The elevating movement is intermittent with each step equal to the thickness of a board, the intermittent movement being effected by means of a controller D. This controller comprises a roller 26 adapted to ride on the uppermost board, as shown in Fig. 1, and it is connected with the upper end of an adjustable rod 27 which has its lower end connected by a bell-crank lever 28, Figs. 1 and 9, with a horizontal clutch-operating rod 29. This rod 29 throws in and out the movable element of the elevator feed clutch E, which is adapted to clutch the bevel gear 31 with the shaft 20 when the roller 26 drops by the passage of the uppermost board from under it. By the closing of the clutch the shaft 20 is turned through the bevel gears 31 and 32, and the cog gear 33, which is meshed with the gearing 10. When the shaft 20 turns, the screws 18 are revolved so as to raise the elevator arms 23 and thereby lift the foremost stack of boards. This upward movement of the stack causes the roller 26 to move upwardly, and this in turn operating through the rod 27, lever 28 and rod 29, opens the clutch E and the elevator is thus thrown out of action.

Figure 4:
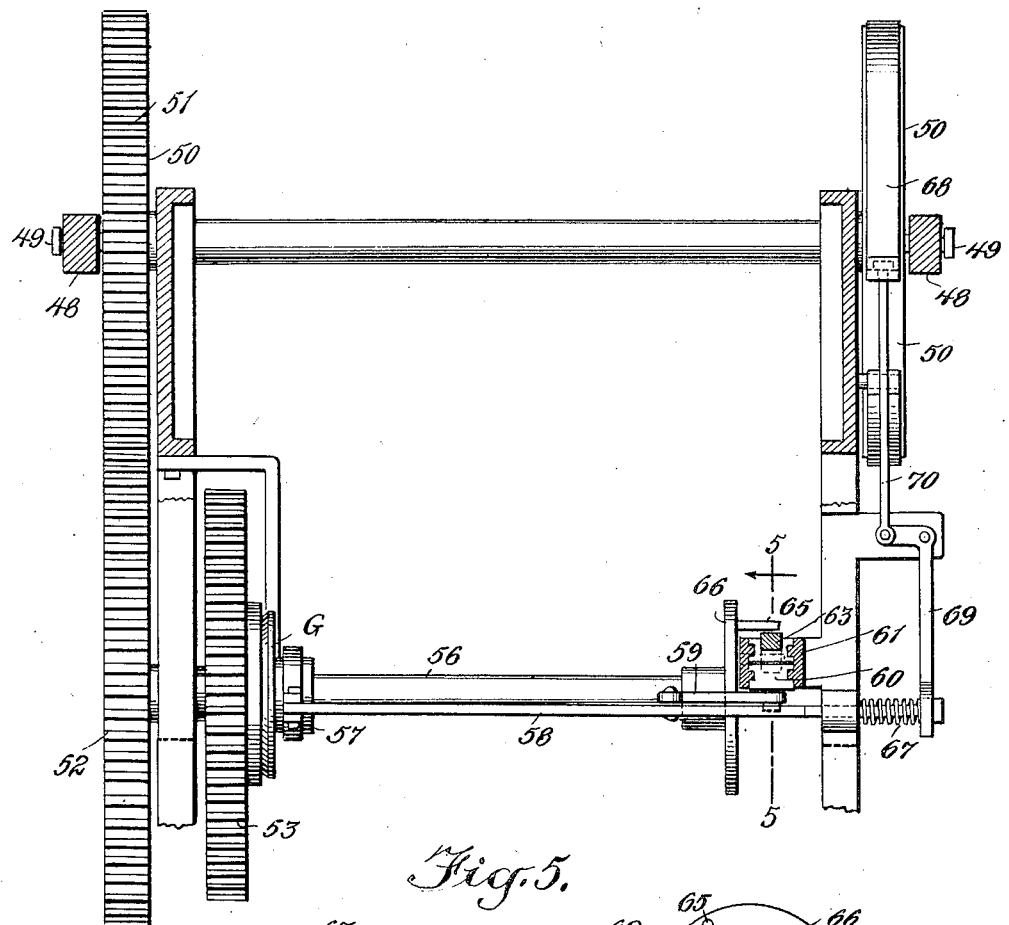
Fig. 4 is a detail vertical section on the line 4—4, Fig. 1.

The controller D has the additional function of operating the board-feeding means F, Figs. 2 and 7. The board-feeding means comprises a pair of jaws 34 and 35 adjustably spaced apart to grip the edges of the uppermost board of the front stack. Each jaw is pivoted at 36 on an arm 37, which in turn is pivoted on a bolt 38, and the bolts are adjustable in a longitudinal slot 39 of a slide or carriage 40, which latter has its ends movable in horizontal guideways 41 in the frame of the machine, as shown in Fig. 8. Each jaw has its tail end 42 provided with a pin 43 that engages in a longitudinal slot 43ª of a horizontally movable jaw opening and closing element 44. This element is pivotally connected with and carried by the inner ends 45 of levers 46 which are fulcrumed at 47 on the ends of a carriage 40, the outer ends of the levers 46 being connected with connecting rods 48 which are connected by crank pins 49 with crank disks or wheels 50. One of the wheels 50 is provided with gear teeth 51, as shown in Figs. 2 and 4, which mesh with a large gear wheel 52 which is connected with a gear wheel 53 that in turn meshes with the gear wheel on the driving shaft 9. Thus, through the gear wheels 53, 52 and 51, the connecting rods 48 are actuated to cause the jaws not only to open and close but to move back and forth for feeding the boards. It will be understood that when the connecting rods 48 move in the direction of the arrow, Fig. 7, the jaws are caused to move from the open full-line position to the closed dotted-line position to thereby grip a board $b$. This closing movement occurs during the initial part of the movement of the connecting rods 48 in the direction indicated by the arrow, and during the further movement the closed jaws are carried forwardly to position for board $b$ to be gripped by the gripping rolls 54 and 55, Fig. 1, of the molding or matching machine. As the wheels 50 turn through one hundred and eighty degrees in an anti-clockwise direction from the position shown in Fig. 1, the connecting rods 48 move the jaws to the left, where they will be in a position to grip the uppermost board of the stack. In traveling to the left the jaws are in open position and lie outwardly from the opposite edges of the boards, and as soon as the second half of the revolution of the wheels 50 begins, the connecting rods 48 first cause the jaws to be moved to closed position in gripping relation to the board, and then continued movement carries the jaws and board to the right, feeding the board into the machine. Although the jaws are not moved to open position until the next revolution begins, the jaws have a yielding engagement with the board as it is drawn forward into the machine by the gripping rolls thereof. It will be understood that the opening and closing of the jaws is effected by the reciprocatory motion of the element 44. The jaws being connected with the element 44 must move with it, but the crank arms 37 cause the jaws to have a curvilinear movement simultaneously, but nevertheless the jaws are free to aline themselves with the edges of the board, since their tail ends are free to move by reason of the pins 43 engaging in the slots 43ª.

Figure 5:
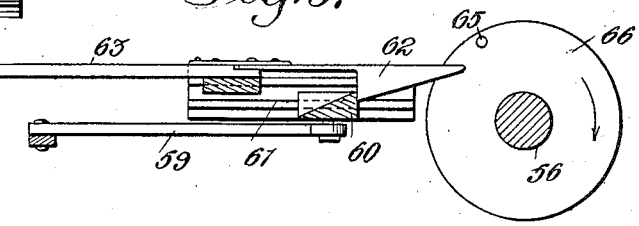
Fig. 5 is a vertical section on the line 5—5, Fig. 4.
Figure 6:
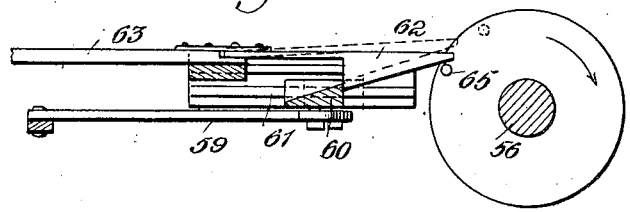
Fig. 6 is a similar view showing the parts in different position.

The throwing on and off of power to the board-feeding device F is effected through a clutch G, Figs. 1, 2 and 4. The movable element of this clutch is operatively connected with a horizontal shaft 56 and is adapted to connect the gear wheel 53 with such shaft. The movable element is operated by a lever 57 that is connected with a rod 58 that is in turn connected with a bell-crank lever 59. This lever is connected with a catch 60, Figs. 4, 5 and 6, that is slidable on guide members 61, and a latch 62 disposed over the catch is arranged to engage behind the same in a manner shown in Fig. 5. The latch 62 is connected with a horizontal reciprocatory rod 63 which is in turn connected, as shown in Fig. 1, through a bell-crank lever 64, with the rod 27 of the controller D. Thus, when the roller 26 of the controller D is moved upwardly the latch 62 is moved to the left, Fig. 5, to the position shown by full lines in Fig. 6. This operates the catch to oscillate the lever 59, which in turn operates through the rod 58 and lever 57 to close the clutch G, whereby power is transmitted to the board-feeding device to cause the jaws thereof to open and travel backwardly and to close and then feed the board forwardly into the molding or matching machine. The latch 62 is adapted to be automatically released by a releasing pin 65 which is mounted on a disk 66 carried by the shaft 56, and when the disk 66 makes one revolution the pin 65 engages under the latch and lifts the same, as shown by dotted lines in Fig. 6, whereby the clutch is opened by a spring 67 which is arranged on the shaft 58, as shown in Fig. 4. Simultaneously with the opening of the clutch G, Fig. 4, the board-feeding mechanism is arrested by means of a brake band 68 which grips the periphery of the front wheel 50, such brake band being operated by a bell-crank lever 69 which is connected with the rod 58 and connected by a rod 70 with the brake band. As shown in Fig. 1, the connecting rods 48 are connected yieldingly with the wheels 50, each connecting rod having a slot 71 in which is a spring means 72 coöperating with the crank pin 49 to form the yielding connection between the rod 48 and its associated wheel 50. The jaws feed a new board against the end of the board in the molding machine which has not passed the rolls 54 and 55, and the wheels continue to complete their revolution, and in so doing the springs 72 are placed under compression, which causes the jaws 42 to move forwardly at the same rate as the board feeding through the molding machine. When the second board reaches the rolls 54 and 55 the feeding movement of the jaws ceases and they release from the board to permit the same to feed into the machine.

The return movement of the stack elevator is effected by means of a clutch H, Figs. 1 and 2, which operatively connects the bevel gear 73 with the shaft 20, the gear 73 meshing with the gear 32. The movable element of the clutch H is connected with a longitudinally movable rod 74, which in turn is connected by a bell-crank lever 74ª with a controller I, which controller is in the form of a rod extending parallel with one of the standards 17 and has upper and lower projections 75 and 76 with which the adjacent arm-carrying block 21 is engageable. Thus, when the block 21 reaches the upper limit of its movement, it engages the lug 75, so as to move the controller I upwardly, which in turn closes the clutch H. This causes continuous movement of the shaft 20 and screws 18 until the blocks 21 are lowered to their limit, when the projection 76 on the lower end of the controller I is engaged to cause the clutch H to open. The stack elevator moves only the foremost stack of boards a distance equal to the thickness of one board so that the uppermost board of the foremost stack will be above the level of the uppermost member of the second stack, and therefore the rear gripping jaw can pass over the second stack without interference to grip the uppermost board of the front stack.

When the elevator arm-carrying blocks 21 reach the lower limit of their movement, the pile carrier is automatically set into operation to advance the pile so that the next stack will be brought to a position over the elevator arms 23. This movement of the pile carrier is effected by a projection 77 on the right-hand block 21, Fig. 1, which projection in descending engages the bell-crank lever 14 and throws the same so that the clutch C will be closed, and as a consequence the shaft 20 is rotated and the pile-carrying chains move forwardly. As shown in Fig. 10, the arm 78 of the bell-crank lever 14 is yieldable laterally against the tension of a spring 79, and this arm is moved by an abutment 80 located in the path of the forwardly moving stack of boards, as shown at $b'$, Fig. 11. As the boards move from the position $b^2$ to $b^3$, Fig. 10, the arm 78 is shifted from the full to the dotted-line position, so that the arm disengages from the projection 77 and consequently the bell-crank lever 14 will return from the dotted to the full-line position, Fig. 1, and permit the clutch C to open, so that the pile-feeding chains will stop when they have moved a distance equal to the width of a stack, that is to say, a distance to bring the stack $a'$, Fig. 3, forwardly to take the place formerly occupied by the stack $a$.

It will be necessary to support the last board of a stack when the elevator arms are moved downwardly. For this purpose horizontally movable supporting arms 81 are mounted on the standards 17, as shown in Figs. 1 and 3. These are slidable on pins or equivalent bearing members 82. A spring 83 tends to throw each arm 81 from the full to the dotted-line position, Fig. 3, so as to support the last board which is indicated by the dotted lines at the top of the stack $a$. The latch 84 on the standard 17 engages a pin or catch 85 on the arm 81, so as to normally hold the same retracted. This latch has a detent 86 located within the associated standard, as shown in Fig. 1, so that when the block 21 rises to its upper limit, the latch 84 is released from the pin 85, so that the arm 81 can shoot rearwardly under the last board. In order to automatically retract these arms 81, each arm is connected with a horizontally movable slide 87 carried on the associated standard 17, and connected by links 88 with the arm 81. This slide extends rearwardly when the arm 81 is supporting the last board, and consequently the slide 87 will be in the path of the bottom of the advancing stack when the pile-feeding device B is again moved. As the stack advances the slide 87 is moved forwardly and this in turn retracts the arm 81 to a position where the latch 84 will automatically engage the pin 85 and hold the arm 81 retracted.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A lumber feeder for woodworking machines, comprising a carrier capable of supporting a plurality of stacks of boards, a driving means, a controllable device for connecting the carrier with the driving means, a stack elevator, a device for intermittently connecting the elevator with the driving means for moving the stack a step at a time equal to the thickness of a board, means for automatically stopping the elevating movement of the elevator when it reaches the limit of its movement in one direction, means for producing a continuous return movement of the elevator and for controlling the said device to automatically operate the pile carrier, and means for automatically controlling the device to stop the pile carrier when the same has moved the next stack of the pile to the elevator.

2. A lumber feeder for woodworking machines, comprising an intermittently movable carrier capable of holding a plurality of stacks of boards, in combination with a stack elevating means comprising screws rotatable intermittently in one direction and rotatable continuously in the opposite direction, and devices movable by the rotation of the screw for elevating a stack intermittently, said devices being returned to normal position by continuous movement.

3. A feeder for woodworking machines including a carrier capable of supporting a plurality of stacks of boards, a plurality of screws, members movable up and down on the screws as the latter rotate, adjustable arms on the members for supporting and lifting a stack of boards, means for intermittently turning the screws to elevate the stack, a device for throwing out the said means when the arms reach the upper limit of their movement, additional means for turning the screws to lower the arms, and a device for throwing out the last-mentioned means when the arms reach the lower limit of their movement.

4. A feeder of the class described comprising a carrier capable of supporting and carrying a plurality of stacks of boards, means for intermittently moving the carrier and including a clutch, a device for causing the clutch to open when the carrier is moved a distance equal to the width of a stack of boards, an elevating mechanism for the stack, means for moving the mechanism intermittently by steps equal to the thickness of a board, and a reciprocatory feeder arranged to grip and feed the uppermost board of the stack.

5. A feeder of the class described comprising a carrier capable of supporting and carrying a plurality of stacks of lumber, means for moving the carrier step by step, a stack elevator, separate clutches for operating the elevator, means for feeding the uppermost board of the stack from the latter, and a controller actuated by the feeding of the uppermost board to alternately control the clutches.

6. In a feeder of the class described, the combination of board-gripping means, a clutch for throwing the same into and out of operation, an elevator for a stack of boards movable intermittently, and a controller in engagement with the top of the stack and set into action by the feeding of the uppermost board and the elevation of the stack for controlling the said clutch.

7. A feeder of the class described comprising a pair of jaws, a carrier, crank arms adjustably mounted on the carrier and on which the jaws are pivoted, an element movable with respect to the carrier, slot and pin connections between the jaws and element, levers mounted on the carrier and connected with the element for moving the latter to open and close the jaws, and reciprocatory actuating means connected with the levers.

8. The combination of grippers of a woodworking machine, with a mechanism for successively feeding boards thereto, said mechanism including gripping jaws, a clutch for controlling the operation of the jaws, a controller adapted to ride on the board being fed and having an up and down movement by dropping off the fed board and being lifted by the next board, and means actuated by the movement of the controller for throwing in and out the clutch.

9. The combination of grippers of a woodworking machine, with a mechanism for successively feeding boards thereto, said mechanism including gripping jaws, a clutch for controlling the operation of the jaws, a controller adapted to ride on the board being fed and having an up and down movement by dropping off the fed board and being lifted by the next board, and means actuated by the movement of the controller for throwing in and out the clutch, said means comprising a latch connected with the controller, a device engageable by the latch for actuating the clutch, and an element for automatically releasing the latch after the board has fed a predetermined distance.

10. The combination of the board-gripping means of a woodworking machine, with a feeding mechanism, said mechanism including jaws for gripping and feeding a board, a power transmitting means for the jaws, a clutch throwing on and off the power, a brake for arresting the transmitting means when the clutch is opened, and a controller actuated by the feeding of one board and the movement of the next board to feeding position for controlling the clutch and the said brake.

11. The combination of the board-gripping means of a woodworking machine, with a feeding mechanism, said mechanism including jaws for gripping and feeding a board, a power transmitting means for the jaws, a clutch throwing on and off the power, a brake for arresting the transmitting means when the clutch is opened, a controller actuated by the feeding of one board and the movement of the next board to feeding position, a latch connected with the controller, means connected with the brake and clutch and engageable by the latch for controlling the brake and clutch, and a device operatively connected with the power-transmitting means for releasing the latch to effect the setting of the brake and the opening of the clutch when a board has been fed to a predetermined position with respect to the said board-gripping means.

12. A feeder of the class described comprising a stack elevator movable step by step, means for successively moving stacks to the elevator, and means for automatically engaging and supporting the last board when the elevator reaches the end of its upward movement.

13. A feeder of the class described comprising a stack elevator movable step by step, means for successively moving stacks to the elevator, means for automatically engaging and supporting the last board when the elevator reaches the end of its upward movement, and means actuated by the next stack when fed to the elevator for retracting said board-supporting means.

14. A feeder of the class described comprising a stack elevator movable step by step, members projectable under the last board when the elevator reaches the upper end of its movement and supporting the board while the elevator descends, spring means for projecting the members under the said board, a catch for holding the members normally retracted and automatically released when the elevator reaches the upper limit of its movement, devices arranged at the bottom of the elevator and engageable by the bottom of the next stack of boards advanced to the elevator, and means connecting the devices with the members for retracting the latter and permitting the latches to automatically set.

15. A feeder of the class described comprising a pile carrier for supporting a plurality of stacks of boards, means for intermittently moving the carrier, an upwardly and downwardly movable stack elevator, means for throwing on the power to the carrier when the elevator is at the bottom of its movement, and means controlled by the movement of a stack to the elevator for throwing off the power to the carrier.

16. A feeder of the class described comprising actuating means having a predetermined feeding movement, gripping jaws moved by the actuating means, and yielding connecting means between the jaws and actuating means, whereby the actuating means can move through their full range before the jaws have finished their feeding movement, whereby the spring means takes the final feeding movement of the jaws.

17. A feeder of the class described comprising rotatable actuating means, reciprocable jaws moved back and forth by the said actuating means, and yielding connections between the jaws and actuating means, whereby the actuating means can complete a revolution before the jaws have finished their feeding stroke, whereby the spring means completes the feeding stroke of the jaws.

JAMES E. BROWN.